US007784353B1

(12) United States Patent
Feldmeier

(10) Patent No.: US 7,784,353 B1
(45) Date of Patent: Aug. 31, 2010

(54) SANITARY DIAPHRAGM PRESSURE GAUGE ADAPTER

(76) Inventor: Robert H. Feldmeier, 7632 Hunt La., Fayetteville, NY (US) 13066

( * ) Notice: Subject to any disclaimer, the term of this patent is extended or adjusted under 35 U.S.C. 154(b) by 0 days.

(21) Appl. No.: 12/499,185

(22) Filed: Jul. 8, 2009

(51) Int. Cl.
*G01L 7/16* (2006.01)
(52) U.S. Cl. .................................. 73/744; 73/861.49
(58) Field of Classification Search .................. None
See application file for complete search history.

(56) References Cited

U.S. PATENT DOCUMENTS

| | | | | | |
|---|---|---|---|---|---|
| 4,380,166 | A | * | 4/1983 | Crombie | 73/1.69 |
| 4,715,230 | A | * | 12/1987 | Tatsuzawa | 73/706 |
| 4,754,648 | A | * | 7/1988 | Byrd et al. | 73/744 |
| 4,790,821 | A | * | 12/1988 | Stines | 604/97.03 |
| 4,862,754 | A | * | 9/1989 | Nimberger | 73/864.62 |
| 4,930,361 | A | * | 6/1990 | Nimberger | 73/864.62 |
| 5,259,235 | A | * | 11/1993 | Kolb | 73/1.65 |
| 6,207,112 | B1 | * | 3/2001 | Spallek et al. | 422/100 |
| 6,701,791 | B2 | * | 3/2004 | Delajoud | 73/744 |
| 7,188,531 | B1 | * | 3/2007 | Feldmeier | 73/744 |

OTHER PUBLICATIONS

Anderson Instrument Co., Fultonville, NY; Anderson Sanitary Pressure Gauges, advt., Jun. 2009.

* cited by examiner

*Primary Examiner*—Lisa M Caputo
*Assistant Examiner*—Jermaine Jenkins
(74) *Attorney, Agent, or Firm*—Bernhard P. Molldrem, Jr.

(57) ABSTRACT

An adapter fits a diaphragm-type sanitary pressure gauge onto a flanged tubular stub of a sanitary conduit. A cylinder has a lower ring flange that mates with the flange of the tubular stub and an upper flange that mates with the diaphragm mounting foot of the pressure gauge. These are held together with tri-clamps, with suitable sealing glands. The interior of the cylinder is two-tiered, with a larger diameter portion above, a smaller diameter portion below, and an annular shelf or step between. A piston with a larger diameter upper portion and smaller diameter lower portion rides in the cylinder, with a seal ring in the lower portion. A hard rubber pad on the top of the piston contacts the diaphragm of the pressure gauge to transmit fluid pressure from the sanitary conduit to the gauge. A small leak detection hole through the cylinder above the seal ring reveals any leakage.

7 Claims, 2 Drawing Sheets

SANITARY DIAPHRAGM PRESSURE GAUGE ADAPTER

BACKGROUND OF THE INVENTION

The present invention relates to monitoring equipment for processing of liquids intended for human consumption, e.g., dairy products such as milk, cream, and ice cream mix, other liquid food products, e.g., fruit juices and soups, or pharmaceuticals. The invention is more particularly concerned with an adapter and a technique for employing a conventional diaphragm-type pressure gauge on sanitary conduits in which such liquid products are processed. The invention concerns an adapter that isolates the diaphragm of the pressure gauge out of direct contact with the process fluid (and out of contact with any caustic cleaning fluids) and which permits a given size of pressure gauge to be fitted onto conduits of a variety of diameters. The present invention also provides a positive visual indication of a failure of a pressure diaphragm or of a seal within the adapter.

Pasteurization is a process for heat treating milk or other food or ingestible product in order to kill pathogens such as bacteria or other microorganisms. The U.S. Public Health Service has published standards for equipment for the pasteurization of milk and other milk products, and there are similar regulations concerning equipment for processing other products. By law, the milk or other product has to be heated to certain temperatures and held at a particular temperature. The pressures and pressure differentials of the product have to be closely monitored at certain points in the process. This means that working pressure gauges have to be present in the conduit, and must be replaced whenever they fail. On the other hand, in order to ensure that the sanitary conduit can be cleansed and sanitized between processes, the conduit is designed so that it can be completely cleaned of any milk or other product by washing it and rinsing it with a cleaning fluid that must reach every point on the interior of the conduit. The cleaning process usually involves a highly caustic component to remove food particles from the walls of the conduit. No threaded connectors can be used anywhere that the liquid product flows, because of the difficulty in cleaning the threads. Standard pressure gauges typically have a threaded stem that is used for securing the gauge into a threaded nipple in the associated equipment. Because there can not legally be any threaded connections at any point at which the product would come into contact with the threads, the standard practice is to use a diaphragm type pressure gauge, instead. This type gauge has a circular fitting foot with a diaphragm and flange disk, and this circular foot is attached, using a tri-clamp or sanitary clamp, on top of an annular flange portion of a stub member that is affixed onto the conduit. The sanitary clamp, or so-called tri-clamp, compresses a sealing gland or ring between these two flanges, so there are no threads exposed to the product in the sanitary conduit. These specially constructed gauges are many times more costly than the standard pressure gauges, and are expensive to replace. In addition, most food processing plants have to keep a variety of pressure gauges in supply, with a variety of diameters of their fitting foot portion, in order to accommodate a variety of diameters of sanitary conduit.

In addition, the diaphragm type gauges mentioned above do not have any means for disclosing a leak or a failure of a seal within the gauge assembly. The liquid food product and the caustic cleaning solution can each cause corrosion of the material used in the pressure transmitting diaphragm. Usually this is a stainless steel, but even so diaphragms fail on may of these pressure gauges in use at dairies, pharmaceutical plants, and elsewhere. Failure of the diaphragm can cause liquid within the gauge to leak out, which can contaminate the food product.

In a regenerative heat exchanger of the type that is used in many pasteurizers, critical temperature differences have to be maintained. To achieve this, flow rates must be kept within narrow limits, which requires critical pressure differentials. For efficient operation it is important to monitor pressure there very closely. It is also desirable to be able to replace a gauge quickly when it fails, and to employ only a single standard size of gauge, in combination with adapters to allow that gauge to be used at any of a number of points on the sanitary conduit.

OBJECTS AND SUMMARY OF THE INVENTION

It is an object of the present invention to provide a pressure gauge adapter that can be easily installed for use in conduits for liquid food products, and which avoids the drawbacks of the prior art.

It is another object to provide an adapter that permits installation of a single standard size of diaphragm pressure gauge on a sanitary conduits of a variety of diameters.

It is a further object to provide a pressure gauge adapter that prevents direct contact of the gauge diaphragm with corrosive liquids in the sanitary conduit.

It is a still further object to provide a pressure gauge adapter that gives a positive visual indication in the event of a failure of the diaphragm of the gauge.

According to one aspect of the invention, a pressure gauge adapter is provided for use in connection with a sanitary conduit, e.g., a product-product heat exchanger of a pasteurizer, through which a liquid product, e.g., milk, flows. The pressure of the product is to be monitored as the product flows through the conduit. At pressure measuring points along the conduit there are tubular stubs for mounting pressure gauges. Each of these tubular stubs permits communication of pressure to the gauge from said fluid. The pressure gauge is a standard type of sanitary gauge with a body portion and a diaphragm foot portion that is configured to fit onto the flange of a conduit tubular stub.

In any of various preferred embodiments, the adapter is a generally cylindrical member and has a lower flange member of a diameter to mate with the flange of the tubular stub, and an upper flange member to seat against the flange at the foot or diaphragm of the pressure gauge. A seal gland or equivalent seal means is disposed between each of these flange members and the mating flanges of said tubular stub and of the pressure gauge. Tri-clamps or equivalent sanitary clamp means holds the flange members in sealed engagement with the tubular stub and pressure gauge. The tri-clamps allow the adapter to be removed for maintenance The adapter cylinder rises from the lower flange member, and has a hollow cylindrical interior wall, formed of a lower cylindrical portion of a given diameter, an annular shoulder, and an upper cylindrical portion above the shoulder with a diameter greater than the diameter of the lower cylindrical portion.

A piston is fitted within the cylinder, the piston having an upper cylindrical portion and a lower cylindrical portion to mate with the upper and lower cylindrical portions of the cylinder, respectively. The piston has an annular step defined between the upper and lower cylindrical portions of the piston and adapted to rest upon the annular shoulder of the cylinder interior.

A seal ring is seated in an annular groove in the lower cylindrical portion of the piston, and the cylinder has an aperture through it at a position above the piston seal ring. This aperture serves to reveal any leakage around the seal ring or any leakage out of the gauge diaphragm.

A pad disk of hard rubber or an equivalent durable and firm resilient material is disposed atop the piston and under the mounting foot of the gauge. The pad is adapted to contact the diaphragm and to transmit the system pressure from the piston to the pressure gauge.

The aperture, i.e., leak-detection hole, which needs only be a small opening through the cylindrical side wall of the cylinder will ensure that any product that leaks past the O-ring seal or seals, or pressure transmitting fluid that may leak through the diaphragm, will become visibly evident.

The various flange members may have a radially tapered outer edge adapted to receive a standard sanitary tri-clamp. The pressure gauge may be of any standard design, and may employ a mechanical or aneroid sensor mechanism, a load cell detector mechanism, or any other system, which may be of conventional design. The gauge may employ either a standard needle dial or a digital display, or may provide an electrical output for remote monitoring.

The piston is favorably formed of a food-grade stainless steel, but in some embodiments a food-grade synthetic resin may be used. The adapter may have its upper and lower flange members of substantially the same diameter; but may also be made with upper and lower flange members that are of substantially different diameters. With the latter arrangement, the diaphragm pressure gauge can be fitted onto any of a variety of pipe sizes, as the adapter can fit a single size of mounting foot onto a tubular stub of a larger or a smaller diameter.

The pad disk may be formed of a suitable hard rubber material. Alternatively, another firm resilient material may be used, and in some embodiments the pad disk is formed of a PTFE material (i.e., Teflon).

The adapter arrangement as shown and described isolates the gauge diaphragm from the sanitary process fluid, and likewise isolates the gauge diaphragm from caustic cleaning solutions and from the hot water or steam used for sanitizing the sanitary tubing. This prevents the fluids from direct contact with the diaphragm, shielding the diaphragm from corrosion. Also, the rubber pad disk serves as a thermal barrier, and shields the pressure gauge from extreme temperature excursions, as well.

The processing equipment associated with this invention may be used for whole milk, skim milk, cream, or other dairy products such as flavored milk or ice cream mix. The arrangements of this invention may also be used for processing citrus products, such as orange juice, grapefruit juice, apple juice, or other fruit juices, tea products, or other fluids which need to be treated in a sanitary manner. The equipment may be of a tubular heat exchanger design, and may be cleaned-in-place with a minimum of down time. A triple-tube heat exchanger that is suitable for use in various possible processes is described in Feldmeier U.S. Pat. No. 3,386,497, which is incorporated herein by reference.

The above and many other objects, features, and advantages of the arrangements and techniques of the present invention will become apparent from the ensuing detailed description of a preferred embodiment of the invention, when considered in connection with the accompanying Drawing.

DETAILED DESCRIPTION OF THE PREFERRED EMBODIMENT(S)

The pressure gauge and adapter of the present invention can be employed in connection with a pasteurization process such as that described in my U.S. Pat. Nos. 7,186,430, Mar. 6, 2007; and 7,435,440, Oct. 14, 2008, which are incorporated herein by reference.

Figure 1:
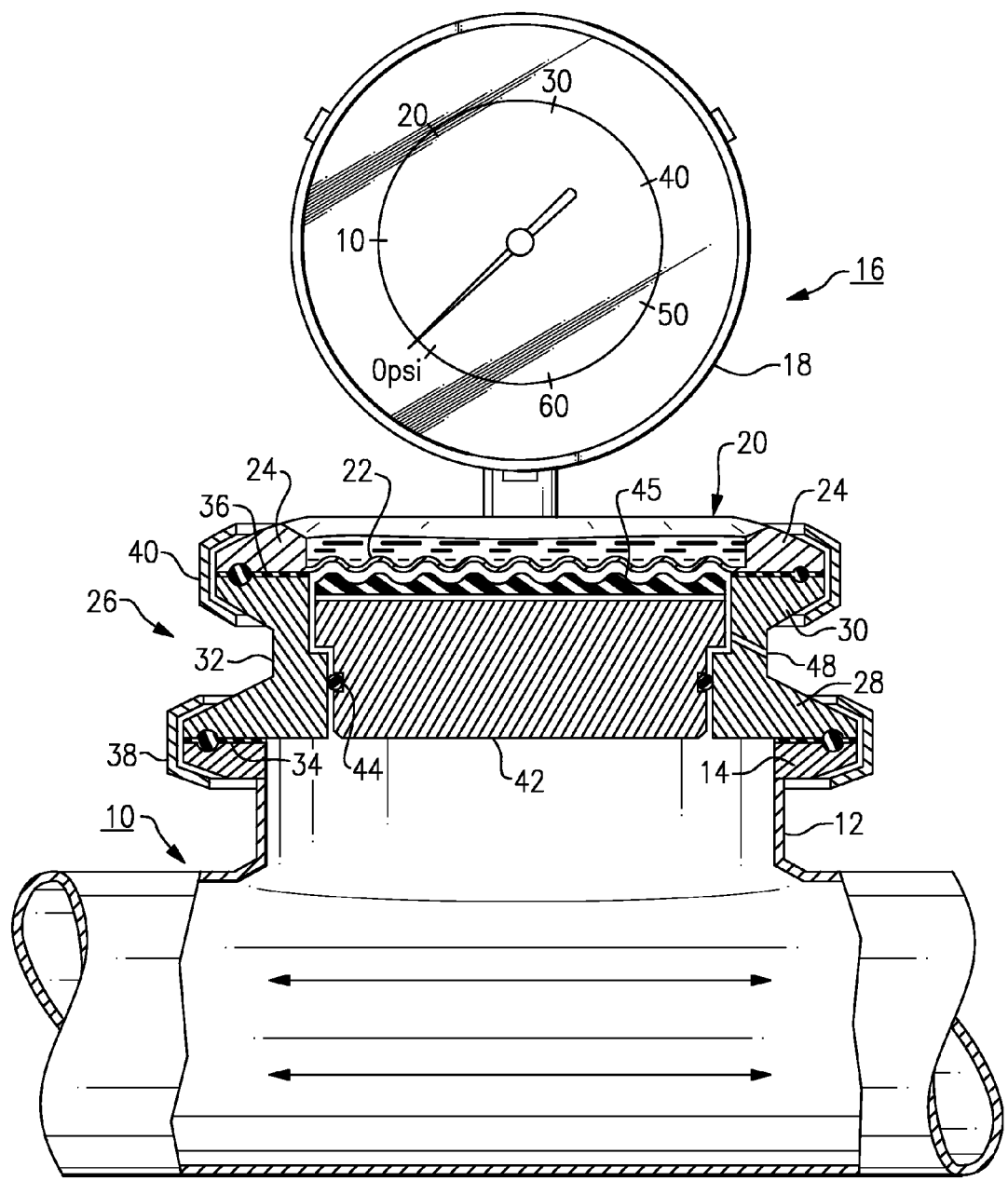
FIG. 1 is a sectional vie of an adapter according to one embodiment of the invention.

With initial reference to FIG. 1, the invention may be employed on a tubular sanitary conduit 10, which may be of the type that processes a dairy product, such as milk or ice cream mix, another edible product such as fruit juice, another beverage, sauce or soup, or a pharmaceutical product for human or veterinary use. In this case, a tubular stub 12 rises from one side of the conduit 10, and provides a location for installing a gauge. The stub 12 has a ring flange 14 at its upper end. The ring flange 14 has a flat upper surface and a tapered lower surface.

An industrial pressure gauge 16 here represents any of a large variety of suitable diaphragm pressure gauges, of various types and having a variety of pressure ranges, depending on the application. In this example, the gauge 16 has a body portion 18 that is disposed outside the conduit 10. The body portion 18 is of a generally cylindrical or disk shape, with a dial, indicator needle, face with temperature gradations, and a cover glass or lens. Alternatively, the gauge could have a digital display or could simply have conductors emerging to lead away toward a temperature display on a control panel or console. As is standard in these diaphragm pressure gauges, a flanged mounting foot 20 is disposed at the lower end of a stem that emerges from the body portion 18. The mounting foot 20 has a metal diaphragm 22, here of an undulating or accordion design, and positioned centrally on the lower or fluid-facing side of the mounting foot. The gauge is fluid filled, and the diaphragm 22 permits transmission of pressure from the sanitary fluid being monitored to the fluid inside the gauge. The mounting foot 20 also has a tapered flange 24 at its peripheral edge, which serves for receiving a clamp.

Atop the tubular stub 12 an adapter 26 is provided for mounting the mounting foot 20 of the gauge 16 is to the ring flange 14 of the tubular stub. The adapter is generally cylindrical in shape and has a lower annular flange member 28 that seats onto the ring flange 14, and an upper annular flange member 30 onto which the mounting foot 20 is seated. Between the upper and lower flanges is a cylindrical section 32, here having a generally cylindrical interior wall that is divided into an upper cylindrical wall of a given diameter and a lower cylindrical wall of a smaller diameter. There is a generally annular shelf or shoulder joining the upper and lower cylindrical portions. A lower gasket or sealing gland 34 seals off the interface between the ring flange 14 and the flange member 28, and an upper gasket or sealing gland 36 seals off between the flange 24 of the mounting foot 20 and the upper flange member 30. A sanitary clamp or tri-clamp 38 is secured onto the ring flange 14 and the lower flange member 28, and a similar sanitary clamp 40 is secured onto the upper flange member 40 and the mounting foot 20. Other means can be employed to join the adapter to the gauge and to the tubular stub.

A two-tier piston 42 within the cylinder 32 enjoys free up-and-down motion, within a limited range. The piston 42 is formed with an upper portion of a diameter to mate with the upper cylindrical portion of the interior cylindrical wall, and a lower portion of smaller diameter to mate with the lower portion of the interior cylindrical wall. An annular shoulder or step between the upper and lower portions rests upon the annular shelf or shoulder of the cylindrical wall (in the absence of fluid pressure in the conduit), and this limits downward travel of the piston 42. The piston has a seal ring 44 seated in an annular groove in the lower cylindrical part of the piston 42. This compresses against the interior wall of the adapter to seal against passage of the sanitary process fluid up around the piston.

In this embodiment, there is a hard rubber pad disk 46 that is seated upon the top surface of the piston 42, facing the diaphragm 22 of the gauge. The pad disk 46 transmits pressure, via the diaphragm 22, to the fluid within the gauge 16. The pad disk is formed of a material that conforms with the undular or accordion shape of the diaphragm, for even transfer of force and clean response over a range of pressures. The adapter 26, with the piston 42, seal 44 and pad 46 isolates the diaphragm 22, chemically and thermally, and prevent contact of the liquid product in the conduit 10 with anything beyond the piston 42. The piston 42 may be stainless steel or may be a food grade or medical grade plastic, e.g., high density high molecular weight PTFE.

There may be two or more seal rings in place of the single seal ring 44 that is illustrated here.

A leak detector hole or aperture 48 is formed through the cylinder portion 32 of the adapter 26 at a position above the travel range of the seal ring 44. The aperture 48 will permit any fluid inside the cylinder and above the seal ring 44 to bleed out, and that will provide a positive visual indication of leakage if it should occur. This will allow detection either of leakage of the product past the seal ring 44, or of leakage of fluid from the gauge in the case of diaphragm failure.

The adapter arrangement also shields the diaphragm 22 from direct contact with the product, and with direct contact with the chemicals and liquids used for cleaning the conduit 10. As a result, there is a much smaller risk of corrosion to the gauge diaphragm, leading to a longer expected operating life for the gauge.

Figure 2:
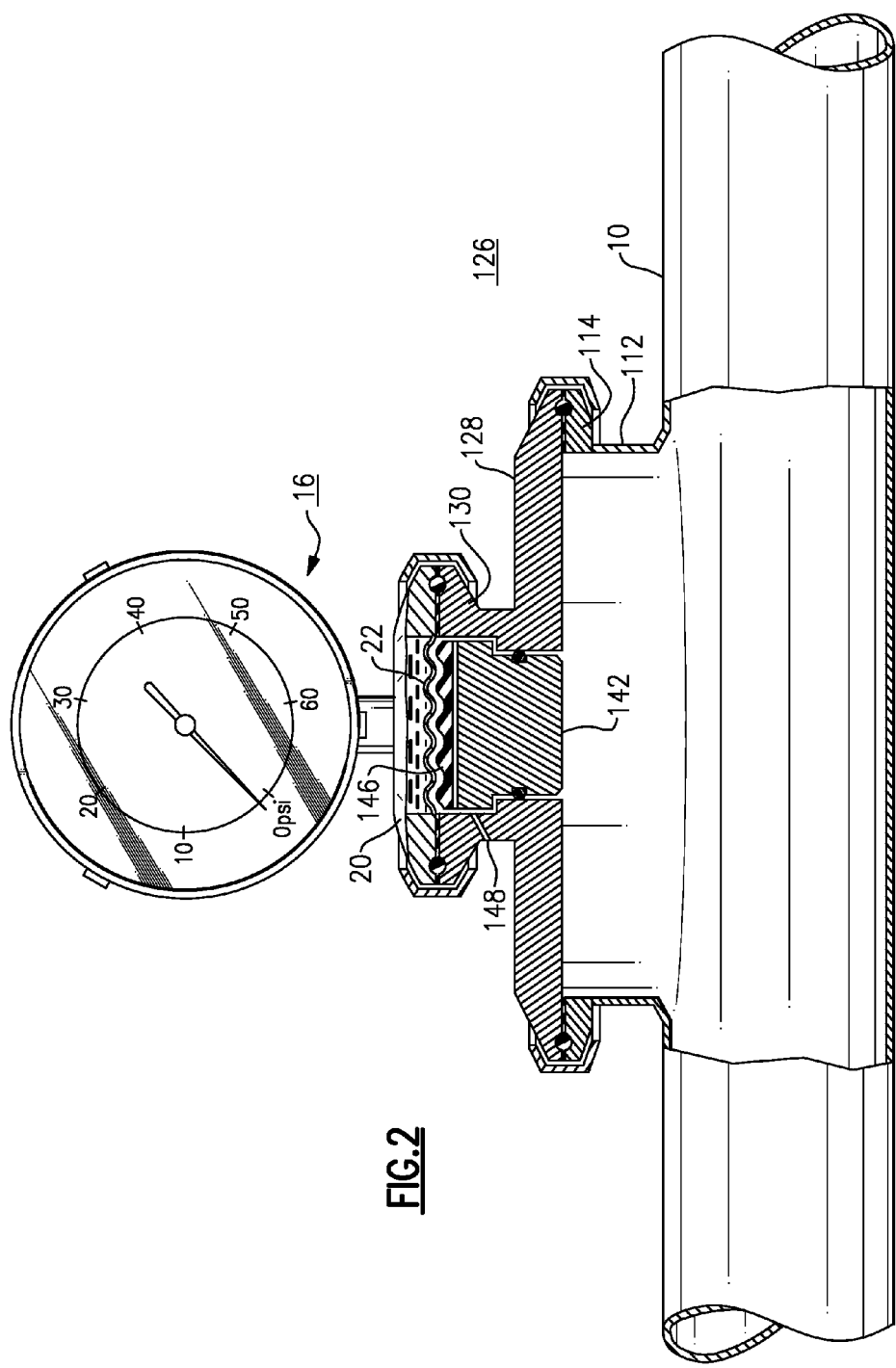
FIG. 2 is a sectional view of an adapter according to another embodiment of the invention.

The adapters can be constructed so as to allow the gauges to be fitted onto conduit of a variety of sizes, so that a smaller number of gauge sizes will be needed. FIG. 2 shows an embodiment of this invention in which a gauge 16 of a given size mounting foot 20 can be fitted onto a conduit 10 with a much larger diameter tubular stub 112. In FIG. 2, elements of the adapter that are identical with the corresponding elements of that of the first embodiment are identified with the same reference numbers, and those which are of a different shape or size are identified with similar numbers but raised by 100. In this embodiment, in order to fit to the tubular stub 112, which is about twice the diameter of the gauge foot 20, the adapter 126 has a lower flange member 128 of a diameter to match the flange 114 of the tubular stub 112, while the upper flange member 130 is a smaller diameter to match the diameter of the mounting foot 20. The cylinder portion of the adapter 126, the two-tier piston 142, and the durable resilient pad disk 146 are similar to those of the first embodiment. Suitable sealing glands and tri-clamps are used.

As in the first embodiment, there is a leakage indicator passage 148 for providing a visual indication of any leakage, i.e., any failure of the piston seal ring or of the gauge diaphragm.

A single size piston can be used with adapters for various sizes of sanitary conduit. The use of one size piston reduces the cost of replacement, as well as reducing the cost of manufacture, as only one size needs to be kept in inventory.

Various materials can be used for the mat disk 46 or 146, such as a hard rubber or rubber like material, or another resilient resin, such a Teflon, or a combination of such materials.

While the invention has been described with reference to selected embodiments, it should be recognized that the invention is not limited to those precise embodiments. Rather, many modifications and variations will be apparent to persons skilled in the art without departing from the scope and spirit of this invention, as defined in the appended claims.

I claim:

1. Pressure gauge adapter for use in connection with a sanitary conduit through which a liquid product flows whose pressure is to be monitored, the conduit having a flanged tubular stub formed on said conduit to mount a sanitary pressure gauge and to permit communication of pressure to said gauge from said fluid; and
   wherein said pressure gauge has a body portion and a flanged circular mounting foot adapted to seat onto the flange of said tubular stub, and having a pressure transmitting diaphragm disposed on a surface of the mounting foot that faces said conduit; the adapter comprising
   a lower flange member of a diameter to mate with the flange of said tubular stub;
   lower seal means disposed between said lower flange member and the flange of said tubular stub;
   clamp means for removably holding said lower flange member in sealed engagement with said tubular stub;
   a cylinder having a hollow cylindrical interior wall rising from said flange member, the cylindrical interior wall having a lower cylindrical portion, an annular shoulder, and an upper cylindrical portion above said shoulder with a diameter greater than that of said lower cylindrical portion;
   an upper flange member disposed at an upper end of said cylinder and being of a diameter to mate with the flanged circular mounting foot of said sanitary pressure gauge;
   upper seal means disposed between said upper flange member and said flange flanged circular mounting foot;
   a piston fitted within said cylinder, having an upper cylindrical portion and a lower cylindrical portion to mate with the upper and lower cylindrical portions of said cylinder, respectively, and an annular step defined between the upper and lower cylindrical portions of said piston adapted to rest upon said annular shoulder;
   a seal ring seated in an annular groove in the lower cylindrical portion of said piston; and
   a pad disk formed of a durable and firm resilient material, and disposed atop said piston, the pad being adapted to contact said diaphragm and to transfer pressure from said piston to the pressure gauge;
   wherein said cylinder has an aperture therethrough at a position above said seal ring, for providing a visual indication of leakage in the case of failure of either said seal ring or said diaphragm.

2. The pressure gauge adapter of claim 1 wherein said flange members and said flanged circular mounting foot each includes a radially tapered outer edge adapted to receive a tri-clamp.

3. The pressure gauge adapter of claim 1 wherein said piston is formed of a food-grade stainless steel.

4. The pressure gauge adapter of claim 1 wherein said upper and lower flange members are substantially the same diameter.

5. The pressure gauge adapter of claim 1 wherein said upper and lower flange members are of substantially different diameters.

6. The pressure gauge adapter of claim 1 wherein said pad disk is formed of a hard rubber material.

7. The pressure gauge adapter of claim 1 wherein said pad disk is formed of a PTFE material.

* * * * *